United States Patent
Kerr

[11] 3,811,782
[45] May 21, 1974

[54] METHOD AND APPARATUS FOR MEASURING THIN FILM ABSORPTION AT LASER WAVELENGTHS

[75] Inventor: Edwin L. Kerr, Ridgefield, Conn.
[73] Assignee: The Perkin-Elmer Corporation, Norwalk, Conn.
[22] Filed: Apr. 9, 1973
[21] Appl. No.: 349,030

Related U.S. Application Data
[63] Continuation-in-part of Ser. No. 181,975, Sept. 20, 1971, Pat. No. 3,727,050.

[52] U.S. Cl. ................... 356/201, 118/9, 356/161, 356/204
[51] Int. Cl. .................. G01n 21/06, G01b 11/00
[58] Field of Search ............ 356/51, 161, 201, 204; 118/9

[56] References Cited
UNITED STATES PATENTS
3,737,237  6/1973  Zurasky .......................... 356/161

Primary Examiner—Ronald L. Wibert
Assistant Examiner—V. P. McGraw
Attorney, Agent, or Firm—John K. Conant

[57] ABSTRACT

Absorption by thin film, such as an optical coating, of a selected laser wavelength is adapted to be measured by apparatus consisting of a thin test chamber whose diameter is at least several times its thickness. One wall of the chamber is a removable window, the opposite wall is reflective. A pressure measuring instrument, such as a capacitance microphone, is connected to measure the pressure of a gas in the chamber, and a laser having a selected test wavelength has its beam directed through the window into the chamber. The laser beam is chopped at an adjustable rate, and the pressure measuring instrument measures a pressure differential between a reference pressure chamber and the test chamber, there being an adjustable leak across the instrument. The test chamber is filled with a gas that does not absorb the test laser beam wavelength and the window is a material which preferably absorbs as little as possible of the wave-length of interest. The pressure in the chamber is first measured with the laser beam applied through the clear window to obtain the zero of the apparatus; any absorption of the laser wavelength by the window heats the gas by conduction and thus produces a pressure rise. Then a film to be tested is mounted in intimate contact with the inside surface of the window and the laser beam is applied through the film. Absorption of the beam wavelength by the film heats the gas and the window by conduction; when the heat of the gas and window reach a steady state the pressure of the gas in comparison with the "zero" pressure measurement is substantially proportional to the absorption of the film.

10 Claims, 5 Drawing Figures

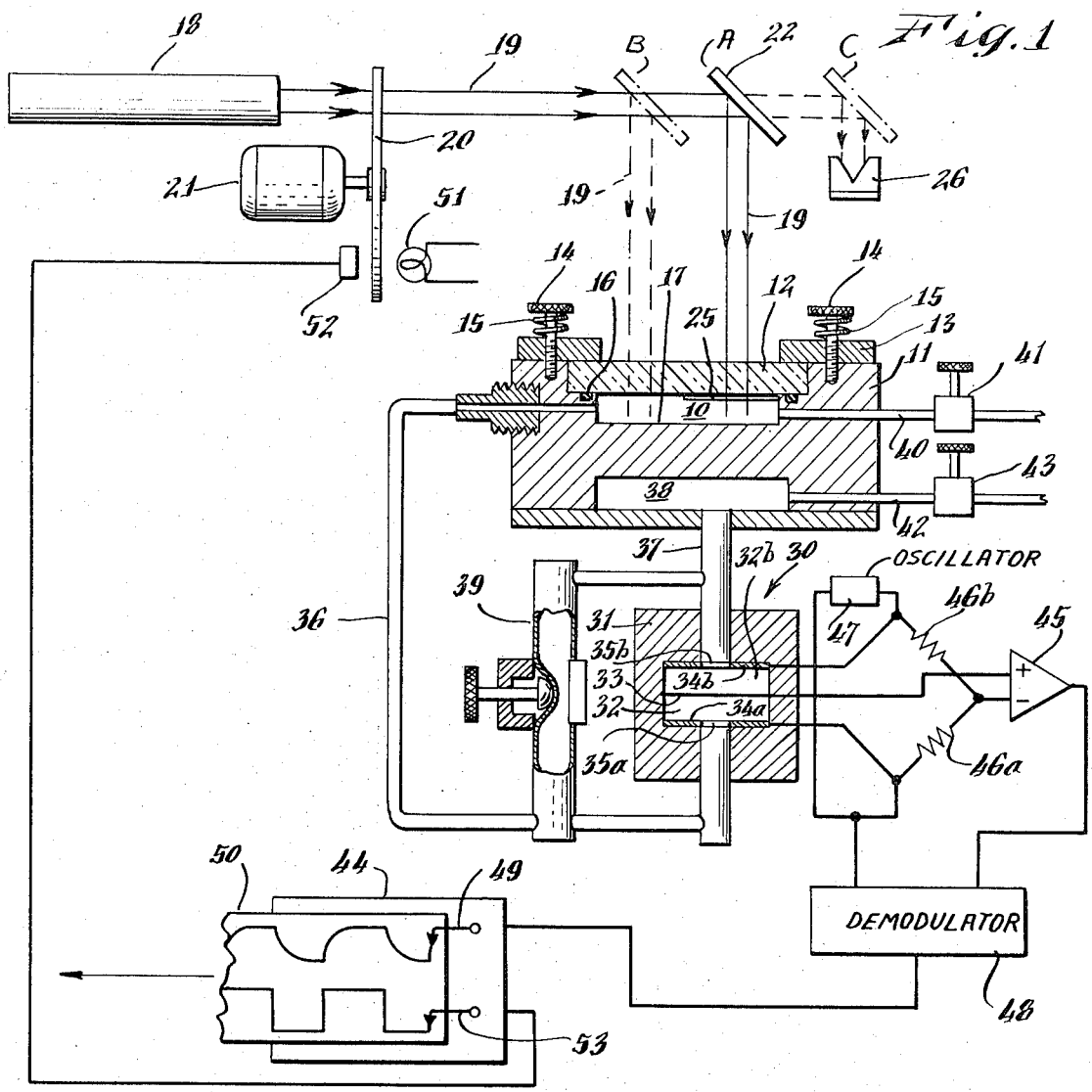
Fig. 1
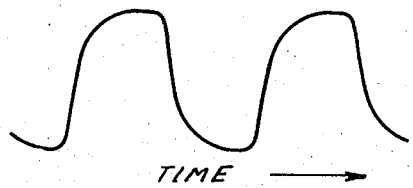
Fig. 2a.  TIME →
Fig. 2b.  TIME →
Fig. 2c.  TIME →
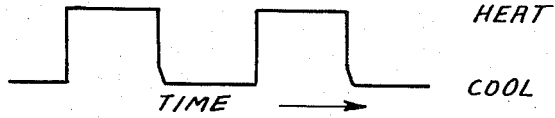
Fig. 2d.  HEAT / COOL  TIME →

METHOD AND APPARATUS FOR MEASURING THIN FILM ABSORPTION AT LASER WAVELENGTHS

This is a continuation-in-part of copending application Ser. No. 181,975, filed Sept. 20, 1971, now U.S. Pat. No. 3,727,050, Apr. 10, 1973, for Gas Analyzer.

BACKGROUND OF THE INVENTION

The foregoing patent discloses apparatus for detecting and measuring a gas component of interest in a sample by applying radiation which is absorbed by the gas of interest in the sample and measuring a pressure increase in a small volume of the sample to determine the amount of absorption, and hence the relative amount of the absorbing gas component present; the present invention makes use of the general apparatus structure and operational principles of the apparatus disclosed by the foregoing patent, but utilizes them in a different manner to provide a method and apparatus for measuring the absorptivity by thin films, such as optical coatings, of selected wavelengths of laser beams.

When very high power laser beams pass through optical windows and coatings, absorption levels must be kept low to avoid overheating and damaging the optical components. For example, if the beam power of a $CO_2$ laser is 50 kW, a coating absorbing only 0.01 percent must dissipate 5W. Considerable research and development is required to fabricate coatings having such low absorptions as well as other desirable properties. It is therefore desirable to be able to measure the coating absorption non-destructively during development and in production.

An absorption of $10^{-4}$ per surface is difficult to measure by conventional methods and is usually inseparable from comparable or larger scattering losses. A conventional spectrophotometer measures the transmission and reflection of a sample. Absorption (plus scattering) is the small difference between 1 and the sum of transmission and reflection. The problem is complicated by multiple reflections from both surfaces of the sample. Furthermore, surface absorption may be separated from bulk absorption only by using several samples having identical surface absorption but different thicknesses, thus sensitivity of measurement to measure absorption on the order of $10^{-4}$ is difficult to achieve.

For these reasons other methods are coming into use. The use of emissivity measurements has been suggested and instruments with the required sensitivity have been made (see "Low Emittance and Absorptance Measurements of Windows and Mirrors," G. Wijntjes, N.J.E. Johnson, and J.M. Weinberg, in "Laser Induced Damage In Optical Materials" National Bureau of Standards Special Publication No. 372, Page 176, 1972, U.S. GPO, Wash., D.C.). A drawback of these emissivity measuring instruments is the requirement for liquid nitrogen cooling of the apparatus, and liquid helium cooling for the detector. Also, scattering contributes directly to the signal.

Another method now being used is the calorimetric method. Calorimetric measurements are insensitive to scattering. In the usual arrangement, the sample is heated in vacuum by a laser beam; the sample temperature rise and the transmitted power are measured and the temperature rise is converted to absorbed power by multiplying by the sample specific heat and mass, and dividing by the irradiation time. Again, surface absorption can only be separated from bulk absorption by using samples of different thickness. Typically 100 sec are required to obtain a sufficient temperature rise. The thermal detector must be attached to the sample in a repeatable way, with good thermal contact and sufficient shielding to prevent direct irradiation by any stray reflection of the laser beam. The present noise limitation of this calorimetric method is about $3 \times 10^{-4}$ absorption per surface.

BRIEF SUMMARY OF THE INVENTION

The present invention measures the absorption by a thin test film of a selected laser beam wavelength by applying the selected wavelength to a test film which becomes heated thereby in proportion to its absorption of the selected wavelength; the test film is in contact with a small volume of gas, and the absorption of the film is measured by measuring the increase in pressure in the gas due to an increase in the temperature of the gas by heat conducted from the film.

As already noted the method and apparatus of this invention utilize the general structural and operational principles of the apparatus disclosed by the above-identified patent, the disclosure of which it is intended to be incorporated herein by reference. The apparatus disclosed by the foregoing patent consists essentially of a very thin cell chamber with a window forming the major portion of one side wall and the inner surface of the opposite side wall being reflective. The interior dimensions of the cell chamber are important to the speed and sensitivity of measurement achieved by the apparatus and, as disclosed, are a thickness from the window to the opposite side wall of from about 0.1 mm. to about 4 mm. and a diameter at least three times the thickness. The apparatus disclosed by the patent is utilized to detect and measure the relative quantity of a gas component of interest in a sample in the cell chamber by directing chopped radiation, such as infrared radiation, of a wavelength coinciding with an absorption band of the gas component of interest into the cell chamber through the window. If a gas component of interest is present it absorbs radiation which results in an increase in temperature, and hence pressure, of the gas, and the proportional amount of a gas of interest present is determined by measuring the pressure increase.

In accordance with the present invention a similar test cell chamber is utilized, but in this instance a sample of the film to be tested is mounted on, and in intimate contact with, the interior surface of the window, and the cell chamber is filled with a gas which does not absorb the test wavelength. The test is adapted for testing the absorption of a selected laser beam wavelength and a suitable arrangement is provided for directing the laser beam into the test chamber through the window. Ideally the window would be made of a material which does not absorb the wavelength applied, but since such materials are difficult or impossible to find, the window is suitably made of a material which absorbs as little as possible of the test wavelength.

In the apparatus of this invention, the window is removable for mounting alternative windows or for coating the inner surface of a window which has been mounted and tested as a clear window for determining its absorption for later use as the "zero" of the apparatus.

In operation the laser beam having the selected test wavelength is directed into the test chamber through the window and is absorbed by, and thus heats, a film on the window, and the window itself, to the extent of their absorptions at the selected wavelength. The heat thus produced heats this window and the gas by conduction and the resulting increase in pressure of the gas due to conduction of heat from the film is proportional to the absorption of the film. The initial heat generated by absorption of the applied wavelength by a film coated on the window goes mainly to heat the window and relatively little goes to heat the gas until the window is saturated. Thus for an accurate determination of absorption of the film, the pressure measurement which is proportional to film absorption must be a measurement of the pressure after both the window and the gas are heated to a steady state, that is, when the temperature of the gas and of the window remain in a steady relation and the temperatures of both rise linearly at the same rate upon further heating.

The critical pressure measurement is suitably provided and measured by chopping the laser beam applied to the test chamber and by detecting the pressure response of the gas in the test chamber by means of a capacitance microphone whose output is measurable by a suitable measuring device, such as a lock-on amplifier and an oscilloscope or pen recorder which indicates the changes in the signal output of the capacitance microphone.

The chopper blocks the laser beam for one half of each cycle and the cyclic period of the chopper is made at least long enough for the temperature of the gas and of the window to at least nearly reach the steady state during the illumination portion of each cycle. Due almost exclusively to the thinness of the test chamber in relation to its diameter, the effective path of heat conduction is from the window to the opposite reflective wall of the test chamber; the body structure is in effect a constant temperature sink for heat so that heat transfer to the end walls of the test chamber has no relevant effect on the sensitivity or the measurements achieved. With this structure and with a chopper which passes illumination continuously for one half its cycle and blocks illumination continuously for the other half, the gas in the test chamber will at first be heated more during an illumination portion of the chopper cycle than it will cool during the immediately following half cycle when the illumination is blocked.

One side of the capacitance microphone is connected to the test chamber, its other side is connected to a reference pressure chamber, and an adjustable by-pass leak is connected across it. This adjustable by-pass is adapted to be adjusted so that a negligible volume of the gas can escape to the reference pressure side of the capacitance microphone during one-half a chopping cycle. Thus the gas is confined at a nominally constant volume and a pressure rise in the test chamber is then proportional to the average gas temperature rise, and hence is proportional to the surface absorption of the test film on the window.

The sensitivity of the apparatus is a function of the chopping rate; by slowing the chopping rate, the by-pass leak being chosen proportionally, the sensitivity is increased, but at the expense of response time. The chopping rate and the by-pass leak are selectable and thus provide means for selecting the sensitivity - response time factors as desired for a particular test run.

With the apparatus and method of this invention an absorption of $1.5 \times 10^{-7}$ by a test film surface can be measured with a modest laser power of 10 watts. This sensitivity is considerably more than usually necessary or desired, the sensitivity may be reduced to produce a shorter measuring time; for example absorption of $10^{-4}$, with a signal to noise ratio of 9, can be measured in 1 minute utilizing a chopping frequency of 1/3 cycle per second and averaging the differences between the peaks and the valleys of the pressure signal over about twenty cycles. This averaging may be facilitated by substituting a lock-on amplifier for the pen recorder 44.

The method and apparatus of this invention permits measurements of single test samples, and can provide separate measurements for each surface depending on which surface faces inward when the sample is mounted in the apparatus. Cryogenic cooling and vacuum systems are not required as in some previously known absorption measuring systems. No special preparation of the test film is required, other than coating or otherwise mounting it on the inside surface of the window, and the apparatus may be designed to accept film test samples of various sizes and shapes and of any normally expected thickness.

BRIEF DESCRIPTION OF THE DRAWINGS

The invention is described in detail below with reference to an illustrative embodiment shown in the accompaning drawings in which:

FIG. 1 is a cross-sectional view through test apparatus embodying the invention, part of the apparatus being illustrated schematically; and FIGS. 2a, 2b, 2c and 2d are graphs representing the output signals from the apparatus, with reference to time, FIG. 2a representing approximately 1 percent absorption of a calcium fluoride film coating on a thallum bromide - thallum iodide window, FIG. 2b representing absorption of the thallum bromide - thallum iodide window alone, FIG. 2c representing the same signal as FIG. 2b but with 3.33 more gain applied to accentuate it, and FIG. 2d representing the output of a reference detector connected to measure the durations of the illuminating and the blocking portions of the laser beam chopping cycle.

DETAILED DESCRIPTION

Referring to the drawings the test apparatus of this invention includes a test chamber 10 formed in a body member 11, one side of the chamber 10 being defined by a transparent window 12 which is removably attached to the body 11 by a clamp ring 13 and screws 14 threaded into the body 11 through holes in the clamp ring. Coil springs 15 around the screws, captured between the screw heads and the surface of the clamp ring, hold the window resiliently in place on the body 11 and allow for thermal expansion of the window 12. The window is sealed to the body by an O-ring 16 in an appropriate groove which is around the circumference of the chamber 10 in the seat for the window in the body. The O-ring and clamping arrangement shown provides a suitable seal since the seal does not have to be vacuum tight but merely pressure tight. The initial pressure of gas in the chamber is not critical and is suitably about 1 atmosphere.

The inner surface 17 of the chamber 10, opposite the window 12 is made reflective.

The dimensions of the chamber 10 and the relative thickness, from the window 12 to the reflective surface 17, in relation to its diameter is critical to the operation of the apparatus and the carrying out of the method of this invention. Specifically the thickness should be from about 0.1 mm. to about 4 mm. and the ratio of the interior diameter to the thickness should be greater than about 3 but not more than about 6. The chamber 10 will normally be circular, but its shape is not critical; if it is square or rectangular its diameter for purposes of the foregoing criteria would be considered a dimension equal to one half the sum of its length and width.

A laser 18 providing a beam 19 of the test wavelength is mounted for its beam to be chopped by a chopper blade 20, rotated by a motor 21, and to be deflected down into the chamber 10 by a movable mirror 22 which is movable to three alternative positions A, B and C. As shown in position A the mirror 22 deflects the laser beam 19 into the chamber 10 through a test film 25 coated on aportion of the inner surface of the window 12. In position B the mirror directs the beam through a clear portion of the window, and in position C it deflects the laser beam to a power meter 26, which is provided for checking the power of the laser beam 19.

In operation the window 12 is made of a material which absorbs as little as possible of the wavelength of interest for the test. At $CO_2$ laser wavelengths, for example, thallum bromide - thallum iodide is a particularly suitable window material. In any event the absorption of the window material should not be appreciably greater than absorption of the film material being tested. The chamber 10 is filled with a gas which does not absorb the wavelength of interest, nitrogen being a suitable gas at $CO_2$ laser wavelengths. A single wavelength laser beam 19 is first directed into the chamber 10 through the clear portion of the window 12 and the pressure in the chamber is measured to obtain a "zero" reading for the test.

Though it would be best if the window were made of a material that does not absorb the test wavelength at all, this appears to be a practical impossibility, so that the "zero" measurement is taken to determine the amount of absorption by the window which must be subtracted from an absorptivity measurement made with the beam 19 directed through a film 25 coated on the window.

When the laser beam 19 is first applied through a test film 25 on the window and irradiation begins, the flow of heat from the absorbing film is divided; the majority of heat flows into the window, while a small fraction flows through the gas to the back, reflective wall of the chamber. The window is effectively insulated by its own low thermal diffusivity, while the body member 11 is sufficiently massive to be in effect, a constant temperature sink for heat. Therefore if the laser beam is not interrupted, the window will in time rise to a steady temperature as it becomes saturated with heat. In this condition, no more heat can be conducted from the film into the window, so all the absorbed energy from the film is conducted through the gas to the back wall of the chamber. This condition produces the maximum possible temperature rise in the gas and the pressure at this point is substantially proportional to the absorptivity of the film and window. Comparison of this pressure with the pressure measured by applying the beam through the clear window, gives a value representing the absorption of the film. At this point the beam may be interrupted, and, after an equally long time for cooling, the beam may be applied again as before and the cycle repeated for a second measurement of the film absorption. The two mesurements would then be averaged to obtain a more precise measurement. Operating the apparatus in this manner obtains the maximum possible sensitivity, but with a correspondingly long measurement time required for the window to become saturated with heat. If the beam is interrupted more rapidly the measurements may be obtained more rapidly with a corresponding reduction in sensitivity.

As already indicated the window 12 is removably mounted on the body 11 so that different windows with different films 25 coated thereon are readily substituted in the apparatus for testing. Clear window portions and window portions coated with a film to be tested may be tested by coating the test film on only a part of the window so as to have another part clear and by shifting the path of the laser beam 19 by movable mirror 22, as shown. Alternatively, two similar windows, one being clear and the other carrying a test coating, could be mounted and tested in succession, or a single window could be tested in uncoated condition, and then be removed, coated and remounted for testing the coating.

The pressure in the chamber 10 is suitably measured by a capacitance microphone 30 consistsing of a body 31 having two compartments, 32a and 32b, therein separated by an electrically conductive, flexible diaphragm 33, which is suitably a stretched steel sheet 0.0002 of an inch thick. Capacitor plates or electrodes 34a and 34b are mounted in the respective compartments 32a and 32b to be substantially parallel to and equally spaced from the diaphragm 33 at opposite sides thereof. The capacitor plates, which are rigid, each have openings, 35a and 35b respectively, therethrough so that the gas pressures in the compartments 32a and 32b apply to flex the diaphragm 33 toward one or the other of the plates 34a or 34b, in proportion to the difference between pressures in the respective compartments. The diaphragm 33 and the capacitor plates 34a and 34b, which are insulated from each other and from the body 31, are connected to suitable electronic elements, subsequently described in detail, for detecting and measuring changes in the relative capacitances of the plates and diaphragm, and hence for detecting and measuring the difference between the gas pressures in the respective compartments 32a and 32b of the capacitance microphone.

The compartment 32a is in fluid flow communication with the test chamber 10 through a conduit 36 so that the gas pressure in the chamber 10 is effective in the compartment 32a. The compartment 32b is in fluid flow communication through a conduit 37 with a reference pressure chamber 38. An adjustable by-pass leak 39 is connected across the capacitance microphone 30, between the conduits 36 and 37 as shown, to provide means for equilibrating the pressures in the compartments 32a and 32b of the capacitance microphone over a selected period of time determined by adjustment of the opening of the by-pass leak. In practice the relative gas pressures in the test chamber 10 and the reference pressure chamber 38 are substantially the same at the start of a test operation and the adjustable by-pass leak 39 is adjusted so that as the gas pressure in test chamber 10, and in compartment 32a, increases during a test operation, a negligible volume of the gas can escape to the reference pressure side of the capacitance microphone (i.e., to the compartment 32b and reference pressure chamber 38) during the illumination half of a cycle of the chopping blade 20. Thus a nominally constant amount of the gas is confined in the test chamber 10 and microphone compartment 32a, so that a rise in pressure therein is proportional to the average temperature rise of the gas, and hence is proportional to the absorption of the window, or of the window and a test film coating 25 thereon.

As shown, gas flow inlet conduit 40, with a valve 41, to the test chamber 10, and a gas flow outlet conduit 42, with a valve 43, from the reference pressure chamber 38 are provided for purging the system prior to a test run, as by flowing dry nitrogen therethrough, and for filling the system with an appropriate non-absorptive gas for a particular test operation.

Changes in capacitance of the capacitance microphone 30, and hence changes in the pressure of gas in the test chamber 10, are suitably recorded on a pen recorder 44 by means of circuitry of the type illustrated. As shown the diaphragm 33 is connected to the positive terminal of a summing amplifier 45; the capacitor plates 34a and 34b are connected to the negative terminal of the amplifier 45 through a bridge circuit which includes resistors 46a and 46b respectively in series between the plates 34a and 34b, and the amplifier 45. An oscillator 47 is connected between the plates 34a and 34b, between the connections of the plates to the resistors. One side of the oscillator 47 and the output of the amplifier 45 are connected to a synchronous demodulator 48 which thus produces a sequence of saw-toothed signals proportional to the changes in the relative capacitances of the two sides of the capacitance microphone 30. The signals from the demodulator 48 are suitably made visible and recorded by being applied to a pen 49 of the pen recorder 44 which records the output of the demodulator continuously on a moving paper web 50. The demodulator signals could also be rendered visible by suitable alternative means such as an oscilloscope, or a lock-on amplifier and a meter.

To facilitate adjusting the apparatus, i.e. the size of the opening of the by-pass leak 39 with reference to the cyclic rate of the chopper blade 20, and to facilitate reading and interpreting the output, it desirable also to generate and record a signal that will visualize the beam blocking and unblocking portions of each cycle of the chopper blade 20 and the time periods of the cycles. For this purpose a lamp 51 is mounted at one side of the chopper blade 20 to cooperate with a detector 52 and actuate the detector to produce a signal when the passage of light from the lamp 51 to the detector 52 is blocked by the chopper blade, but not when the light is free to pass to the detector. As previously noted the chopper blade 20 blocks the laser beam 19 for one half of each cycle. By having the detector 52 operate in the aforesaid manner and by mounting the detector 52, lamp 51 combination 180° from the path of the laser beam 19 through the chopper blade 20, the signals produced by the detector 50 thus coincide with the illumination portion of the chopper cycle, when the laser beam passes into the test chamber 10. The detector 52 is connected for its output signals to operate a pen 53 of the pen recorder 44 on a track below the track of the pen 49. Thus, as shown, the pens 49 and 53 both produce graph lines representing the signals generated by the output of the test apparatus and of the detector 52, respectively, and both lines are in the same time relation to the cyclic rate of the chopper blade 20.

For operation the apparatus is suitably adjusted by installing a window 12 and test coating 25 having a combined absorption of about 1 percent of a selected $CO_2$ laser wavelength. For example a suitable window may be made of thallum bromidethallom iodide, the film coating may be calcium fluoride and the wavelength is suitably 10.6 micrometers at about 10 watts. The system is filled with dry nitrogen to a pressure of about 1 atmosphere, valves 41 and 43 are closed, and after the pressure in the system settles to a steady substantially equal value at the respective sides of the capacitance microphone, the by-pass leak is closed nearly completely. The chopping rate is initially set quite slow, on the order of about 0.1 cycles per second and the laser 18 and pen recorder 44 are turned on. The by-pass leak 39 is then opened slowly, with pauses to allow the pressure transients to die down, until the peaks of the pressure signal line as recorded by the pen 49 begin to droop just noticeably after the initial peak. The leak then acts as a high-pass filter, causing the linearly rising pressure to settle to a constant value. Then the chopping frequency is increased until the beam 19 is interrupted by rotation of the chopper blade 20 (indicated by the drop in the line drawn by pen 53) just after the flat top of a pressure signal line drawn by pen 49 begins to droop.

FIGS. 2a, 2b and 2c show typical recordings of pressure signals, and FIG. 2d shows the square wave signal representing the cycles of the chopper blade 20 at the same time the pressure signals were recorded. FIG. 2a shows the trace produced when a calcium fluoride film coating 25 was measured with 10.4 watts input power from a $CO_2$ laser 18 and with an ambient pressure of approximately 1.2 atmosphere of nitrogen in the system. FIG. 2b and 2c show the corresponding absorption signal produced by a thallum bromide - thallum iodide window 12 alone; the trace of FIG. 2b is recorded with same scale factors as those used for the calcium fluorde film in FIG. 2a, while the trace of FIG. 2c shows the same signal with a factor of 3.33 in gain. The accentuated trace of FIG. 2c does not represent a noise signal, but rather shows that bulk absorption in a thin layer near the surface of the window also contributes to the transmission loss. Similar tracings were obtained for a thorium fluoride and zinc sulfide double-layer coating. The optimum dimensions for the thickness and diameter of the test chamber 10 are, as previously noted, somewhere between a thickness of from 0.1 mm. to about 4 mm. and ratio of diameter to thickness more than about 3 but not greater than about 6. In general the thinner the chamber 10, the more rapid will be the allowable chopping rate and hence, the effect of any drift in power of the laser 18 will be reduced. Also, the fraction of heat diffusing through the gas is greater as the thickness is reduced. These arguments suggest making the chamber as thin as possible. However, as the thickness is reduced, the irradiated volume is reduced and (assuming the dead volume is made as small as possible but cannot be reduced further) the volume reduction factor is worsened. This suggests making the chamber as thick as possible, but these two criteria are in conflict. Analysis suggests that sensitivity increases slowly with thickness, but it has been determined that the thickness should not be greater than about one sixth of the diameter in order to provide the requisite direction heat flow, and that the thickness should be between 0.1 and 4 mm. with the optimum probably close to 1 mm.

It should be noted that surface scattering produces almost no error in the absorption measurement made with the apparatus and method of this invention. This is in direct contrast to conventional methods for measuring absorption, where loss from the beam by scattering is inseparable from loss from the beam by absorption. With the apparatus disclosed herein the pressure signal is sensitive only to the loss from the beam that contributes to heating of the surface; it is insensitive to scattering losses because they do not heat the surface and the only error results from any small discrepancy that may exist between the power measured by the power meter 26 and the power actually incident on the surface of a film coating 25 on the window 12.

This apparatus and method provide a demonstrably workable method to measure surface absorptions as small as $10^{-4}$ with a signal-to-noise ratio of 9 or better at carbon dioxide laser wavelengths. The method lends itself to stable, absolute calibration and is insensitive to surface scattering and other loss mechanisms that do not heat the surface.

What is claimed is:

1. Apparatus for measuring the absorption by a thin film of a given wavelength of a laser beam comprising:

a body element having a thin test chamber therein;
   a removable window forming one side wall of the test chamber for admitting a laser beam and the opposite side wall of the chamber being reflective;
   the interior diameter of the test chamber being substantially greater than the interior thickness thereof from the window to the opposite, reflective, side wall, said thickness being from about 0.1 mm, to about 4 mm, and the ratio of the diameter to the thickness being not less than about 3;
   means for directing the beam from a laser into the test chamber through said window; and
   means for measuring a change in the pressure of a gas in the test chamber due to a change in temperature and pressure of a gas therein when a sample film, whose absorptivity at a selected laser beam wavelength is to be tested, is mounted on the inside of said window and a laser beam of said selected wavelength is directed into the chamber.

2. The apparatus of claim 1 in which the ratio of the diameter of the test chamber to its thickness is not more than about 6.

3. The apparatus of claim 1 which includes cyclic means for interrupting the passage of said laser beam into the test chamber continuously during a portion of each cycle thereof, and in which said means for measuring a change in the pressure of a gas in the test chamber includes:
   a capacitance microphone comprising a first and a second compartment separated by a flexible electrically conductive diaphragm with a pair of capacitor plates respectively in the compartments;
   fluid flow communication means between the first compartment and the interior of the test chamber for the pressure of the gas in the test chamber to be effective in the first compartment;
   means for initially equalizing the gas pressure in the first and second compartments;
   means connected to sense the changes of capacity respectively of said capacitor plates and said diaphragm by deflection of the diaphragm;
   means connected to sum said changes of capacity;
   means connected to produce electrical signals proportional to the sum of said changes of capacity; and
   means to measure the value of said signals.

4. The gas analyzer of claim 3 in which said means for intially equalizing the gas pressure in the first and second compartments comprises a by-pass gas leak connected between the compartments, and in which said cyclic means interrupts said laser beam continuously only during one half of each cycle thereof, and said by-pass leak is adapted to provide a small passage therethrough such that only a negligible volume of the gas escapes from the first to the second compartment during the one half of each cycle of said cyclic means when said laser beam is unblocked and is directed into the test chamber, whereby the volume of gas in the test chamber and first compartment remains substantially constant during said half cycle.

5. The apparatus of claim 4 in which the frequency of the cycles of the cyclic means and the size of the passage through the by-pass leak are adjustable.

6. The apparatus of claim 4 which includes detector means responsive to the cycles of said cyclic means and producing different value signals respectively during the portions of each cycle of the cyclic means when the laser beam is interrupted and when it passes to the test chamber.

7. The apparatus of claim 6 which includes means for recording both the signals from said detector means and the signals from said means whose signals are proportional to said sum of changes in capacity.

8. A method of measuring the absorption by a thin film of a given laser beam wavelength comprising:
   providing a test chamber which has a window forming one side wall with the interior surface of the opposite side wall being reflective, whose interior thickness from the window to the reflective surface is from about 0.1 mm to about 4 mm and the ratio of the interior diameter to interior thickness being between about 3 and about 6;
   providing said window of a material whose absorption at said wavelength is known and is at most only slightly greater than the approximate expected absorption of a film to be tested;
   filling the chamber with a gas that is substantially non-absorptive of said wavelength;
   applying said wavelength laser beam through said window into the chamber, so that any heat absorbed by the window heats the window and the gas by conduction;
   measuring the pressure of the gas in the chamber for determining the pressure effective in the chamber at a time at which the gas and the window are heated by conduction to a point such that further heating by conduction increases the temperature of the gas and window at the same linear rates;
   mounting a film to be tested on, and in intimate contact with, at least a portion of the surface of the window inside the chamber;

applying said wavelength laser beam through said window and through the film thereon so that heat absorbed by the film, and any heat absorbed by the window, heat the window and gas by condution;

remeasuring the pressure of the gas in the chamber in the same manner as before; and thereafter comparing the two measurements to determine their difference whereby said difference is substantially proportional to the absorption of said wavelength by the film.

9. The method of claim 8 including cyclically interrupting the laser beam to the chamber, each cycle consisting of a continuous period of beam interruption and a substantially equal period when the beam applies to the chamber, measuring the pressure of the gas in the chamber continuously, measuring the difference between the high and low measurement of the gas pressure in each of said cycles for a number of successive cycles, averaging said differences, measuring said differences and averaging said differences with the laser beam directed through a clear portion of the window to obtain a first average and then measuring and averaging with the laser beam directed through the window and through a test film on the inside surface of the window to obtain a second average, and determining the difference between the second and first average.

10. The method of claim 8 in which the frequency of said cycles is 1/3 cycle per second and in which said difference measurements are averaged over a number of cycles on the order of at least twenty.

* * * * *